April 8, 1924.

J. WEBSTER 1,489,872

TEAPOT, COFFEEPOT, JUG, AND LIKE POURING VESSEL

Filed May 26, 1923

Inventor.
James Webster
by Herbert W. Jenner,
Attorney.

Patented Apr. 8, 1924.

1,489,872

UNITED STATES PATENT OFFICE.

JAMES WEBSTER, OF TUNSTALL, STOKE-ON-TRENT, ENGLAND.

TEAPOT, COFFEEPOT, JUG, AND LIKE POURING VESSEL.

Application filed May 26, 1923. Serial No. 641,605.

*To all whom it may concern:*

Be it known that I, JAMES WEBSTER, subject of the King of Great Britain and Ireland, and resident of Tunstall, Stoke-on-Trent, in the county of Stafford, England, earthenware manufacturer, have invented certain new and useful Improvements in Teapots, Coffeepots, Jugs, and like Pouring Vessels (for which I have filed application in Great Britain by application for Patent No. 9927, dated the 12th day of April, 1923), of which the following is a specification.

My invention relates to improvements in teapots, coffeepots, jugs and like pouring vessels, the object being to provide simple means for retaining the lid or cover in position during pouring and thus preventing it falling away from the main vessel.

The invention consists essentially in constructing the teapot or pouring vessel with a lid having a rear extension to make contact with the top of the handle, said extension being provided with a downwardly extending projection to engage a hole through the top portion of the handle.

Figure 3:
Figure 1:
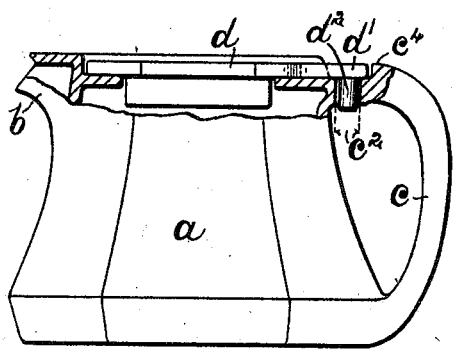
Figure 4:
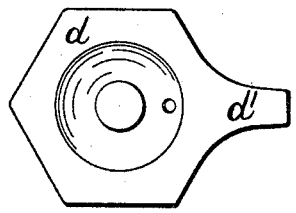
Figure 2:
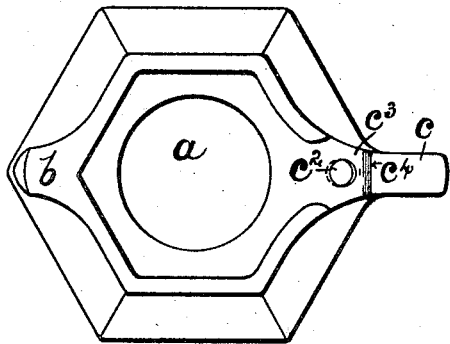
Figure 5:
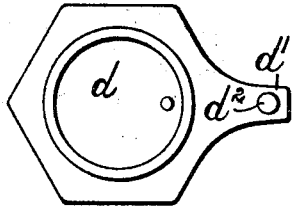

My invention will be fully described with reference to the accompanying drawings in which, Fig. 1 is an elevation of a teapot, partly in section, with the lid in position, Fig. 2 is a plan of Fig. 1 with the lid or cover removed, Fig. 3 is an elevation of the lid or cover, Fig. 4 is a plan of Fig. 3, and Fig. 5 is an inverted plan thereof.

In the drawings $a$ is the vessel or body of the teapot, $b$ the spout, $c$ the handle, and $d$ the lid or cover.

According to my said invention the lid or cover $d$ is constructed with a rear extension $d^1$ to make contact with the top of the handle $c$, said extension being provided with a downwardly extending projection $d^2$ to engage a hole $c^2$ through the top of the handle as shown at Fig. 1.

The top inner portion of the handle $c$ is reduced in thickness at $c^3$ (Fig. 2) so that the top of the rear extension $d^1$, of the lid when in position, is level with the highest portion $c^4$ of the handle as clearly shown at Fig. 1. By this means the lid or cover when in the mouth of the vessel can be retained in position, during the pouring of the liquid, by placing the thumb on the extension $d^1$.

In the drawings I have illustrated a teapot of approximately hexagonal section in plan and provided with a sunk lid or cover but I wish it to be understood that my invention is applicable to other shapes or formations of teapots or pouring vessels and to lids or covers of the raised type having an upstanding knob or handle.

What I claim as my invention and desire to secure by Letters Patent is:—

In a pouring vessel, a body portion provided with a handle and having a hole at the upper part of the handle and a projection on the handle adjacent to the hole, and a lid disconnected from the body portion and provided with a projection which is slidable vertically in the said hole, said lid having its top portion adjacent to the handle arranged substantially flush with the said projection on the handle.

In testimony whereof I have hereunto set my hand in the presence of two witnesses.

JAMES WEBSTER.

Witnesses:
J. BENTON,
PATTIE PLANT.